United States Patent [19]

Yoshida et al.

[11] Patent Number: 5,745,443
[45] Date of Patent: Apr. 28, 1998

[54] MAGNETO-OPTICAL DISC HAVING A PROTECTIVE FILM WITH MINIMAL PROJECTIONS AND METHOD OF PRODUCTION OF SAME

[75] Inventors: Mikio Yoshida; Etsuro Ikeda, both of Miyagi, Japan

[73] Assignee: Sony Corporation, Tokyo, Japan

[21] Appl. No.: 667,227

[22] Filed: Jun. 19, 1996

[30] Foreign Application Priority Data

Jun. 21, 1995 [JP] Japan ................... 7-154400

[51] Int. Cl.$^6$ ................................................. G11B 11/00
[52] U.S. Cl. ........................................ 369/13; 360/114
[58] Field of Search ........................... 369/13, 14; 360/59, 360/114, 66, 103, 104, 109, 105, 75, 119

[56] References Cited

U.S. PATENT DOCUMENTS 5,107,471  4/1992  Miyake et al. ............................ 369/13
5,303,100  4/1994  Nakayama et al. ...................... 360/104

*Primary Examiner*—Ali Neyzari
*Attorney, Agent, or Firm*—Hill & Simpson

[57] ABSTRACT

A magneto-optic disc comprised of a substrate on which are formed a recording layer and a protective film and on which information is recorded by a magnetic head floating above the magneto-optic disc by a predetermined floating distance at least at the time of recording the information, wherein the height of the projections on the surface of the protective film of the magneto-optic disc is smaller than the floating distance of the magnetic head.

5 Claims, 5 Drawing Sheets

MAGNETO-OPTICAL DISC HAVING A PROTECTIVE FILM WITH MINIMAL PROJECTIONS AND METHOD OF PRODUCTION OF SAME

BACKGROUND OF THE INVENTION

The present invention relates to a magneto-optical disc on which information is recorded by a so-called floating type magnetic head and to a method of production of the same. More particularly, it relates to a magneto-optical disc given resistance to servo error and damage to the magnetic head by controlling the height of projections on the surface of a protective film which becomes the outermost surface thereof and to a method of production of the same.

The magneto-optical recording system is based on the principle of partially raising the temperature of a magnetic thin film over the Curie point or a temperature compensation point to eliminate the magnetic coercivity that part and reverse the orientation of magnetization to the direction of the recording magnetic field applied from the outside. It has been put into practical use in optical file systems and external storage devices of computers, devices for recording audio and video information, etc.

As the recording medium of the magneto-optical recording system, use is generally made of a magneto-optical disc included of a substrate on which is formed a recording layer made of one or more layers of functional film.

When recording information on a magneto-optical disc, a laser beam or the like is focused onto the magnetic thin film to raise the temperature of the magnetic thin film over the Curie point or the temperature compensation point as mentioned above to eliminate the magnetic coercivity of that part and reverse the orientation of magnetization to the direction of the recording magnetic field supplied from the outside and thereby record the information.

As a method of recording information by reversing the orientation of magnetization of the magnetic thin film in this way, there can be mentioned the so-called light intensity modulation system of constantly applying a DC external magnetic field and emitting the laser beam in accordance with the existence of the signal and the so-called magnetic field modulation system of constantly emitting a laser beam having a constant intensity and modulating the external magnetic field in accordance with the signal.

For example, in a 3.5 inch or 5.25 inch magneto-optical disc used in an external storage device of a computer, the light intensity modulation system is used as the system for recording information.

Further, in a compact magnetic disc having a diameter of about 64 mm mainly used in the field of the audio information, the magnetic field modulation system is used as the system for recording information.

In the magnetic field modulation system, it is necessary to switch the direction of the magnetic field at a high speed. For this purpose, it is necessary to bring the magnetic head as close to the surface of the magneto-optical disc as possible. Accordingly, in for example a compact magneto-optical disc, the magnetic head is made to slide on the surface of the magneto-optical disc. Further, another method of bringing the magnetic head as close to the surface of the magneto-optical disc as possible, the method has been conceived of using a gap servo to holding constant the distance between the magnetic head and the magneto-optic disc.

However, the magneto-optical disc as described above is obtained as mentioned above by forming on a substrate a recording layer made of one or more layers of functional film. Usually a protective film is formed on the recording layer. The protective film is formed by a so-called spin-coating process consisting of supplying an acrylic or other ultraviolet ray-curable resin or the like onto the substrate on which the recording layer is formed and then causing the substrate to rotate to spin off the resin at a high speed and reduce its thickness. Accordingly, the surface of the protective film sometimes has projections formed by the splashing of the resin during the high speed spin-off, a gel substance or dust in the resin, or dust on the substrate.

Such projections do not pose any practical problem in the case of a magneto-optical disc of 3.5 inch or 5.25 inch used for example in an external storage device of a computer as mentioned before since the light intensity modulation system is used and therefore the magnetic head is arranged at a position relatively far away, in particular, in a magneto-optical disc of 5.25 inch, since two magneto-optic discs are adhered to each other for use.

Further, in a compact magneto-optical disc having a diameter of about 64 mm mentioned before, the magnetic head tracks the surface of the magneto-optical disc, so the magnetic head strikes the uneven portions on the surface of the magneto-optical disc, but there is no practical problem even if there are projections on the surface of the protective film so long as the recording density and linear speed corresponding to the rotational speed are the same in degree as those at the present.

There is a problem, however, in the light intensity modulation system as mentioned above, in that it is necessary to once apply an erasing magnetic field, align all the magnetic thin films in a certain direction, and then perform the recording again. Therefore, the operation is more troublesome than that in the magnetic field modulation system and in addition the time required for recording becomes long. On the other hand, in the magnetic field modulation system, the recording is carried out while erasing the information, therefore the operation is simplified and also the time required for the recording is shortened, but since the laser beam is emitted as it is, it is difficult to reduce the recording pits and higher density recording is difficult.

In recent years, particularly in magneto-optical discs used in external storage devices of computers, higher density recording has been demanded. To cope with this, it has been proposed to use the optical modulation system concurrently with the magnetic field modulation system. Namely, the method of modulating both of the magnetic field and light in accordance with the information signal has been proposed. According to this, since the recording is carried out while erasing the information by the magnetic field modulation system, the operation is simplified and, at the same time, the time required for recording is shortened. Since the optical modulation system is used concurrently, the recording pits can be made smaller and a higher density recording is achieved. In order to further increase the recording density by using the above method, it is necessary to raise the speed of rotation of the magneto-optic disc.

Note that, in order to use the optical modulation system concurrently with the magnetic field modulation system, it is necessary to bring the magnetic head as close as possible from the point of the magnetic field modulation to the magneto-optic disc. Namely, preferably the information is recorded by the system used in the magnetic field modulation system.

In the method of causing the magnetic head to slide on the magneto-optical disc, however, the projections on the surface of the protective film of the magneto-optical disc will strike the magnetic head, therefore it is difficult to raise the rotational speed to more than the current speed, higher density recording is difficult, and it is also difficult to raise the transfer rate of information.

On the other hand, in the method of using a gap servo, it is sufficiently possible to raise the rotational speed of the magneto-optical disc, but this method requires a complicated mechanism which makes it difficult to provide an inexpensive drive.

Therefore, in order to achieve a further higher density recording by using the light intensity modulation system concurrently with the magnetic field modulation system, it has been proposed to use a magnetic head floating above the magneto-optical disc while holding a predetermined floating distance at least at the time of recording information, i.e., a so-called floating type magnetic head, as the magnetic head.

Where a floating type magnetic head is used, however, there arises the problem of the projections on the surface of the protective film of the magneto-optical disc as mentioned before. Namely, this is because, where there are too large projections on the surface of the magneto-optical disc, these projection will strike the floating magnetic head and the resultant vibration will cause a deviation in the servo control of the optical pick-up provided in the magnetic head or damage the magnetic head per se.

OBJECT AND SUMMARY OF THE INVENTION

Accordingly, an object of the present invention is to provide a magneto-optical disc on which information is recorded by a floating type magnetic head wherein the projections on the surface of the protective film will not strike the magnetic head and servo error and damage to the magnetic head are hard to occur and to provide a method of production of the same.

So as to achieve this object, according to one aspect of the present invention, there is provided a magneto-optical disc included of a substrate on which are formed a recording layer and a protective film and on which information is recorded by a magnetic head floating above the magneto-optical disc by a predetermined floating distance at least at the time of recording the information, wherein the height of the projections on the surface of the protective film of the magneto-optical disc is smaller than the floating distance of the magnetic head.

Note that, in the magneto-optical disc, preferably the height of the projections is not more than 10 μm, the diameter is not more than 90 mm, the rotational speed is set to not less than 2400 rpm, and the information is recorded by the magnetic field modulation system.

According to another aspect of the present invention, there is provided a method of production of a magneto-optical disc included of forming at least one functional film on a substrate by a vacuum thin film-forming means so as to form a recording layer and supplying a resin onto this, then performing high speed spin-off to coat the resin and form a protective film, wherein the resin is filtered at least three times before the resin is supplied or, before the resin is supplied, a gas is blown over the surface of the recording layer of the substrate or the high speed spin-off is carried out in a filter unit, and further, after the formation of the protective film, the height of the projections on the surface of the protective film is inspected by the reflection of light and discs having a height of projections of not more than a predetermined value are separated for use. All of these latter steps may be performed as well.

Note that, in the above method of production of the magneto-optical disc, preferably the resin is filtered one time by a filter having a pore size of 1 μm and then filtered two times by a filter having a pore size of 0.2 μm and the gas is nitrogen.

In summary, in the magneto-optical disc of the present invention, since the height of the projections on the surface of the protective film is set smaller than the floating distance of the magnetic head, even if the magnetic head floats above the magneto-optical disc by a predetermined floating distance at the time of recording of the information, the magnetic head will not strike the projections on the surface of the protective film of the magneto-optical disc.

Further, in the production of the magneto-optical disc of the present invention, by forming one or more functional films on the substrate by a vacuum thin film forming means to form a recording layer, blowing a gas over the surface of the recording layer of the substrate, or supplying a resin filtered three or more times onto the substrate or performing high speed spin-off in a filter unit to coat the resin and form the protective film, the surface of the protective film will become resistant to the formation of projections. Further, by inspecting the height of the projections on the surface of the protective film by the reflection of light after the formation of the protective film and separating the discs having a height of projections of not more than a predetermined value, it is possible to eliminate magneto-optical discs having a height of the projections larger than the predetermined value.

BRIEF DESCRIPTION OF THE DRAWINGS

These and other objects and features of the invention will become clearer from the following description of the preferred embodiments made with reference to the accompanying drawings, in which.

DETAILED DESCRIPTION OF THE PREFERRED EMBODIMENTS

Figure 1:
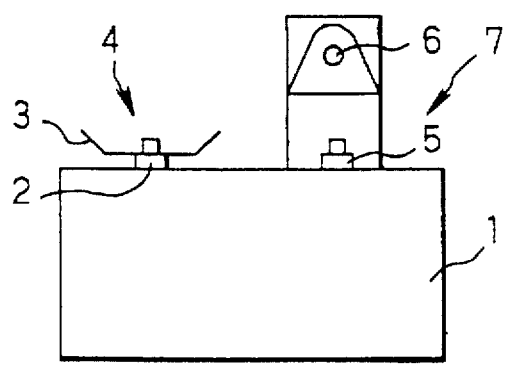
FIG. 1 is a schematic side view of principal parts schematically showing one example of a spin coater.

First, so as to confirm the effect of the present invention, the following experiment was carried out. Namely, various functional films were formed on a polycarbonate substrate for a 3.5 inch magneto-optical disc by a sputtering process so as to form the recording layer, then an acrylic ultraviolet ray-curable resin was coated on this by a spin coating method and an ultraviolet ray was emitted to cure this resin and form a protective film having a thickness of 10 μm and thereby produce a plurality of magneto-optical discs. Then, the maximum heights of the projections (hereinafter, referred to as the height of the projections) on the surface of the protective films of the magneto-optical discs were measured.

Among the above plurality of magneto-optical discs, magneto-optic disc samples 1 to 9 having the heights of the projections as shown in Table 1 were selected.

TABLE 1

| Sample no. | Height of projections (μm) | Existence of occurrence of servo trouble |
| --- | --- | --- |
| 1 | 0.86 | No |
| 2 | 1.62 | No |
| 3 | 3.27 | No |
| 4 | 5.10 | No |
| 5 | 7.69 | No |
| 6 | 9.84 | No |
| 7 | 12.29 | Yes |
| 8 | 15.06 | Yes |
| 9 | 19.58 | Yes |

Next, a measurement unit was constructed by attaching, in place of a magnetic head, a tip having a similar shape to a commercially available 3.5 inch magneto-optical disc drive and setting the distance between the tip and the magneto-optical disc, that is, the floating distance, to become 10 μm or more when rotating the magneto-optical disc at a speed of over 2,400 rpm. The existence of servo trouble, that is, deviation of the focus servo control and the tracking servo control, when the magneto-optical disc samples 1 to 9 were attached to the measurement unit was examined. The results are shown in Table 1 as well.

It was confirmed from the results of Table 1 that in the magneto-optical disc samples 7 to 9 having a height of projections larger than the floating distance, the servo error signal became large and servo trouble such as deviation in the focus servo control and the tracking servo control occurred, while in the magneto-optical disc samples 1 to 6 having a height of projections smaller than the floating distance, no servo trouble occurred.

Namely, it was confirmed that when recording information on a magneto-optical disc by using a floating type magnetic head, if the height of the projections on the surface of the protective film of the magneto-optical disc is made smaller than the floating distance of the magnetic head, the magnetic head will not strike the projections on the surface of the protective film of the magneto-optical disc and the occurrence of servo trouble can be suppressed. It is seen from this that no damage of the magnetic head will occur either if the above processing is carried out.

Next, the method of production of the magneto-optical disc of the present invention will be explained. In order to produce the magneto-optical disc of the present invention, first, one or more layers of functional films are formed on a substrate by a procedure such as a sputtering process so as to form the recording layer.

Next, the substrate on which the recording layer is formed is placed in a spin portion of a so-called spin coater for performing spin coating. As shown in FIG. 1, the spin coater includes a main body 1 on which are arranged a spin portion 4 comprising a shaft 2 and a receiving plate 3 and a curing portion 7 including a shaft 5 and an ultraviolet ray lamp 6. The substrate on which the recording layer is formed is supported by the shaft 2 of the spin portion 4.

Figure 2:
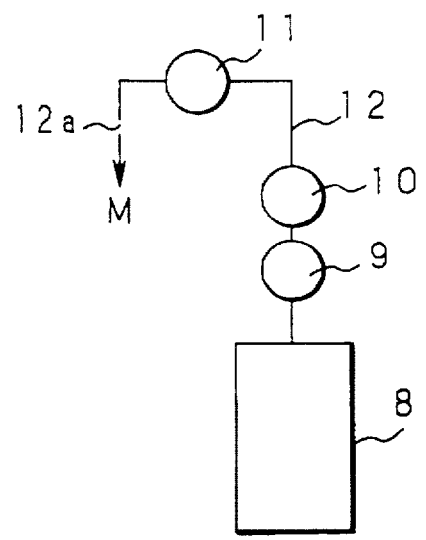
FIG. 2 is a schematic view showing one example of a resin supplying device.

Simultaneously with this, an acrylic ultraviolet ray-curable resin for forming the protective film is preliminarily filtered three or more times. As shown in FIG. 2, the resin supply device included a tank 8 filled with the ultraviolet ray-curable resin, a first filter 9, second filter 10, and third filter 11 arranged at the middle of a conduit 12, and a resin supplying portion 12a. Resin is supplied from the tank 8 through the conduit 12 and out of the portion 12a on to the substrate arranged in the spin portion of the spin coater, not illustrated, as indicated by an arrow M in the figure. The first filter 9 is made a filter of a pore size of 1 μm, and the second filter 10 and the third filter 11 are respectively made filters of a pore size of 0.2 μm. By supplying the resin from the supplying device as described above when supplying the resin onto the substrate on which the recording layer is formed, a resin preliminarily filtered three or more times is supplied.

Thereafter, the shaft 2 is rotated to turn the substrate and the resin is spun off at a high speed to form a thin coat of the resin on the substrate. At this time, the left over resin which is spun off is collected by a receiving dish 3.

The substrate on which the resin is coated is then moved to the curing portion 7 of the spin coater, where it is supported by the shaft 5 and irradiated by ultraviolet light from the ultraviolet ray lamp 6 to cure the resin and thereby form the protective film and complete the magneto-optical disc.

Figure 3:
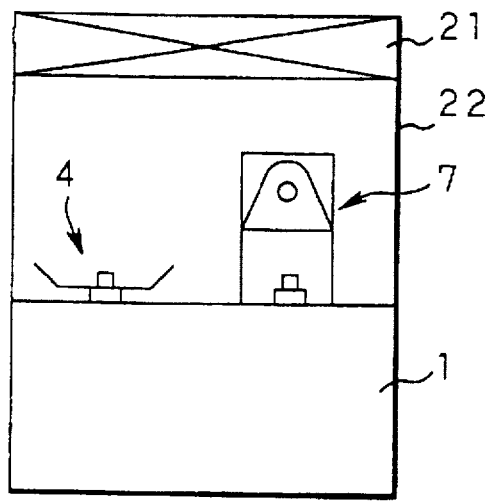
FIG. 3 is a schematic side view of principal parts schematically showing another example of the spin coater.

To produce the magneto-optical disc of the present invention, in addition to the method as described above, mention may also be made of the method of using a spin coater as shown in FIG. 3, included of a spin coater having a similar configuration as the above spin coater, that is, a body 1 on which a spin portion 4 and a curing portion 7 are arranged, but with a filter unit 21 supported by a support 22 at for example a ceiling portion of the spin coater, and performing the high speed spin-off in that filter unit 21.

Figure 4:
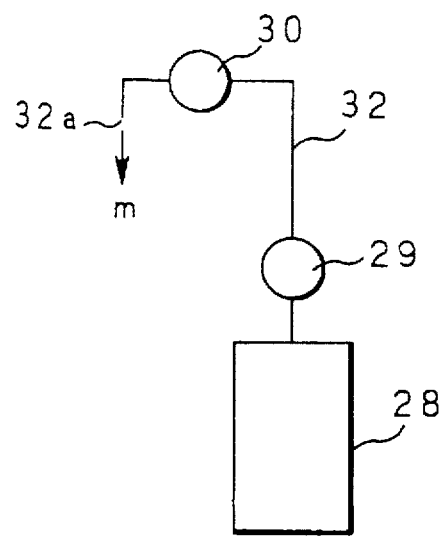
FIG. 4 is a schematic view showing another example of the resin supplying device.

Namely, the substrate on which the recording layer is formed is arranged in the spin portion 4 of the spin coater and the ultraviolet ray-curable resin is supplied on to the substrate to coat it with the resin. In this case, use is made of a resin supplying device as shown in FIG. 4, which supplies the resin from a tank 28, filled with the ultraviolet ray-curable resin, via a conduit 32 in which a first filter 29 and a second filter 30 are arranged, and then out from a resin supplying portion 32a as indicated by an arrow m in the figure. The resin coated on the substrate is then cured to form the protective film and complete the magneto-optical disc.

Another method for producing the magneto-optical disc of the present invention, other than the methods as described above, is the method of blowing a gas over the surface of the recording layer of the substrate before supplying the resin onto the recording layer of the substrate so as to remove any dust from the surface of the recording layer.

Figure 5:
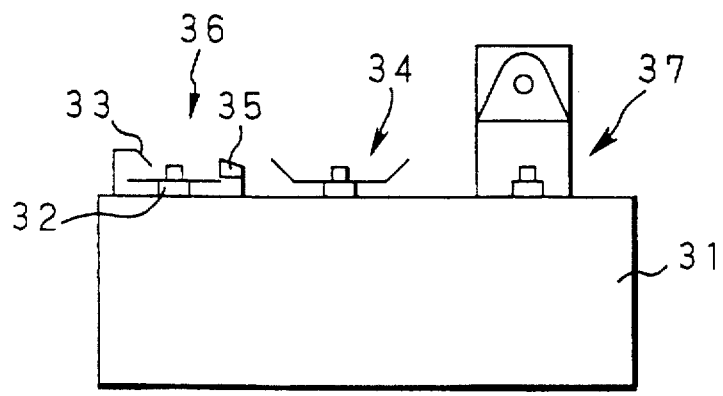
FIG. 5 is a schematic side view of principal parts schematically showing still another example of the spin coater.

Namely, as shown in FIG. 5, it is also possible to use a spin coater as shown in FIG. 5 included of a main body 1 on which a spin portion 34 and a curing portion 37 are arranged in parallel, similar to the above spin coater, but further provided with a blowing portion 36 including a shaft 32, a blow nozzle 33, and an exhaust duct 35 arranged adjacent to the spin portion 34.

Figure 6:
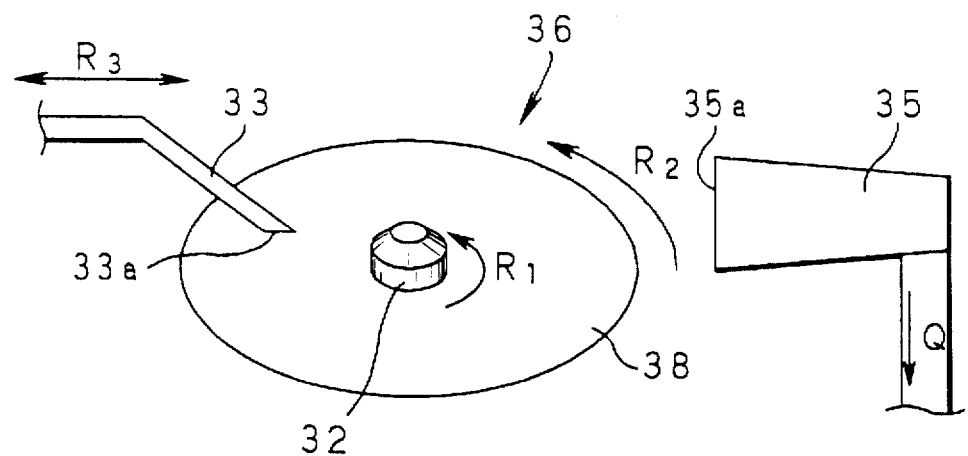
FIG. 6 is a schematic perspective view of principal parts schematically showing a blowing unit of still another example of the spin coater while enlarging the same.

In the blowing portion 36, as shown in the enlarged view of FIG. 6, the substrate 38 is rotated in a direction indicated by an arrow $R_2$ in the figure by a shaft 32 rotating in the direction indicated by an arrow $R_1$ in the figure. The blow nozzle 33 has a blowout port 33a arranged close to the surface of the substrate 38 and can move in the diametrical direction of the substrate 38 as indicated by an arrow $R_3$ in the figure. An exhaust duct 35 is arranged so that an intake port 35a is close to the surface of the substrate 38 and the gas is exhausted in a direction indicated by an arrow Q in the figure by an exhaust duct 35.

In the blowing portion 36, the surface of the substrate 38 is charged negative, therefore a corona discharge is caused inside the blow nozzle 33 and positively charged nitrogen gas is blown out.

Namely, so as to produce the magneto-optical disc, first, the substrate on which the recording layer is formed is supported by the shaft 32 of the blowing portion 36 of the spin coater and the positively charged nitrogen gas is blown over the surface of the recording layer to remove any dust on the surface of the recording layer. Next, the substrate is moved to the spin portion 34 where it is coated with a resin, then is moved to the curing portion 37 where the protective film is formed and the magneto-optical disc is completed.

As another method for producing the magneto-optical disc of the present invention, it is also possible to inspect the height of the projections on the surface of the protective film by the reflection of light after the formation of the protective film and to separate for use those discs having a height of the projections of not more than a predetermined value.

Figure 7:
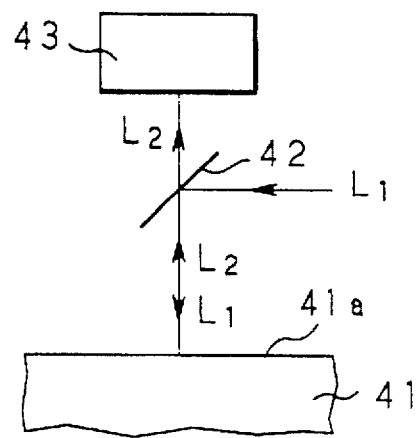
FIG. 7 is a schematic view of one example of a relationship between a laser beam emitted on a protective film and a reflection beam.

Namely, first, the recording layer is formed on the substrate, then for example the spin coater as shown in FIG. 1 and the resin supplying device as shown in FIG. 4 are used to form the protective film on the substrate. Then, as shown in FIG. 7, a laser beam is emitted as indicated by an arrow $L_1$ in the figure from a not illustrated light source, is reflected by a beam splitter 42 arranged midway, and is irradiated to the surface 41a of the protective film 41. The light reflected back as indicated by an arrow $L_2$ in the figure is transmitted through the beam splitter 42 and received by the light position detecting element 43 after which the displacement and the amount of the reflection light are measured. As shown in FIG. 7, when there are no projections on the surface 41a of the protective film 41, the light will be reflected back perpendicularly from the surface 41a of the protective film 41, in other words, above in the figure. Next, the discs having a height of the projections of not more than the predetermined value are separated for use to thereby complete the magneto-optical discs.

Figure 8:
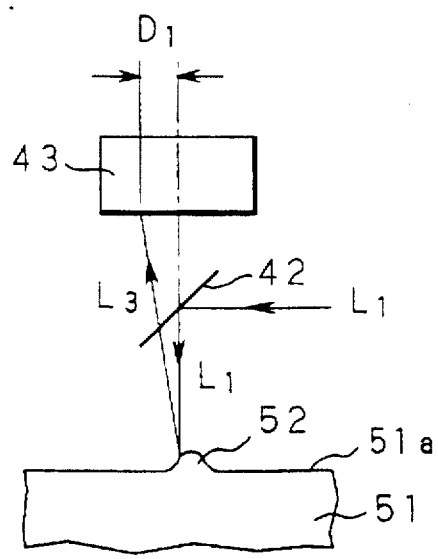
FIG. 8 is a schematic view of another example of the relationship between the laser beam emitted on the protective film and the reflection beam.
Figure 9:
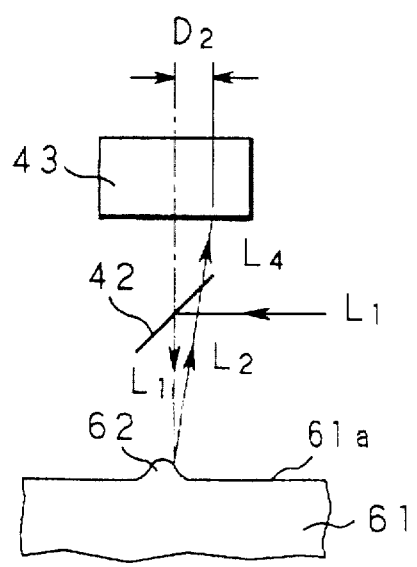
FIG. 9 is a schematic view showing still another example of the relationship between the laser beam emitted on the protective film and the reflection beam.

When there are projection portions 52 and 62 on the surfaces 51a and 61a of the protective films 51 and 61 as shown in FIG. 8 and FIG. 9, the laser beam irradiated in the direction indicated by the arrow $L_1$ in the figures will be reflected in the direction indicated by the arrows $L_3$ and $L_4$ in the figures, that is, the light will be deviated from the perpendicular direction of the surfaces 51a and 61a of the protective films 51 and 61 indicated by the one dotted chain line in the figures exactly by the amounts $D_1$ and $D_2$ in the figures, respectively. The displacement and amount of reflected light measured by the light position detecting element 43 will also change as a result.

The heights of the projections 52 and 62 are measured from the displacement of the reflected light and the change of the amount of light. It becomes possible to use these results to separate for use discs having the heights of projections of not more than a predetermined value.

When the magneto-optical disc is produced by the methods as mentioned above, it becomes difficult for the projections to be formed on the surface of the protective film or those magneto-optical discs having a height of projections larger than a predetermined value can be eliminated by inspection. When the magneto-optical disc of the present invention is used, when the information is recorded by a floating type magnetic head, the projections on the surface of the protective film will not strike the magnetic head and therefore there will be little servo error or damage to the magnetic head.

Note that, needless to say, a similar effect is obtained if the magneto-optical disc is produced by a method of production including all of the methods of production mentioned heretofore.

As apparent also from the above explanation, in the magneto-optical disc of the present invention, since the height of the projections on the surface of the protective film is made smaller than the floating distance of the magnetic head, even if the magnetic head floats above the magneto-optical disc by a predetermined floating distance at the time of recording of the information, the magnetic head will not strike the projections on the surface of the protective film of the magneto-optical disc and therefore there will be little servo error or damage to the magnetic head.

Further, in the production of the magneto-optical disc of the present invention, by forming one or more functional films on the substrate by a vacuum thin film forming means to form a recording layer, blowing a gas over the surface of the recording layer of the substrate, or supplying a resin filtered three or more times onto the substrate or performing high speed spin-off in a filter unit to coat the resin and form the protective film, the surface of the protective film will become resistant to the formation of projections. Further, by inspecting the height of the projections on the surface of the protective film by the reflection of light after the formation of the protective film and separating the discs having a height of projections of not more than a predetermined value, it is possible to eliminate magneto-optical discs having a height of the projections larger than the predetermined value.

What is claimed is:

1. A magneto-optical disc, comprising:

a substrate;

a recording layer formed on said substrate; and a protective film formed on said recording layer, wherein information is recorded in said recording layer by a magnetic head floating above the magneto-optical disc by a predetermined floating distance from said recording layer, wherein, said protective layer comprises a film of resin filtered to remove impurities greater than 0.2 μm, said recording layer comprises one or more thin film layers the height of projections on the surface of the protective film of the magneto-optical disc being smaller than the floating distance of the magnetic head and not more than 10 μm.

2. A magneto-optical disc as set forth in claim 1, wherein the diameter of the magneto-optic disc is not more than 90 mm.

3. A magneto-optical disc as set forth in claim 1, wherein the rotational speed is set to at least 2400 rpm.

4. A magneto-optical disc as set forth in claim 1, wherein the information is recorded by a magnetic field modulation system.

5. The magneto-optical disc of claim 1, wherein an interface between an uppermost surface of the recording layer and the protective layer is dust-free.

* * * * *